United States Patent
Shavell et al.

(10) Patent No.: US 9,730,075 B1
(45) Date of Patent: Aug. 8, 2017

(54) SYSTEMS AND METHODS FOR DETECTING ILLEGITIMATE DEVICES ON WIRELESS NETWORKS

(71) Applicant: Symantec Corporation, Mountain View, CA (US)

(72) Inventors: Michael Shavell, Merrimack, NH (US); Matt Boucher, Merrimack, NH (US); Christopher Robichaud, Belmont, MA (US); Kevin Jiang, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/617,245

(22) Filed: Feb. 9, 2015

(51) Int. Cl.
*G06F 7/04* (2006.01)
*H04W 12/12* (2009.01)
*H04L 29/06* (2006.01)

(52) U.S. Cl.
CPC ......... *H04W 12/12* (2013.01); *H04L 63/1483* (2013.01)

(58) Field of Classification Search
CPC . H04W 12/12; H04L 63/1483; H04L 63/1441
See application file for complete search history.

(56) References Cited

U.S. PATENT DOCUMENTS

| | | | |
|---|---|---|---|
| 8,060,734 B1 * | 11/2011 | Newstadt | G06F 9/4406 713/1 |
| 8,095,672 B1 * | 1/2012 | Newstadt | G06F 21/40 705/75 |
| 8,191,143 B1 | 5/2012 | Lin et al. | |
| 8,606,219 B1 | 12/2013 | Barbee et al. | |
| 8,844,041 B1 | 9/2014 | Kienzle et al. | |
| 8,959,235 B1 * | 2/2015 | Newstadt | H04L 69/28 709/227 |
| 9,256,766 B1 * | 2/2016 | Newstadt | G06F 21/88 |
| 9,325,731 B2 * | 4/2016 | McGeehan | G06F 21/55 |
| 9,420,513 B1 | 8/2016 | Yalagandula et al. | |
| 2003/0219008 A1 | 11/2003 | Hrastar | |
| 2003/0233567 A1 | 12/2003 | Lynn et al. | |
| 2004/0117624 A1 | 6/2004 | Brandt et al. | |
| 2004/0236547 A1 | 11/2004 | Rappaport et al. | |
| 2006/0193284 A1 | 8/2006 | Stieglitz et al. | |
| 2006/0200862 A1 | 9/2006 | Olson et al. | |

(Continued)

OTHER PUBLICATIONS

Michael Shavell, et al; Systems and Methods for Preventing Computing Devices from Sending Wireless Probe Packets; U.S. Appl. No. 14/949,927, filed Nov. 24, 2015.

(Continued)

*Primary Examiner* — Krisna Lim
(74) *Attorney, Agent, or Firm* — FisherBroyles LLP

(57) ABSTRACT

The disclosed computer-implemented method for detecting illegitimate devices on wireless networks may include (1) generating a fake network identification string that uniquely identifies a fake wireless network, (2) transmitting a request to connect to the fake wireless network, (3) receiving, in response to the request, a response from a network device that indicates the fake wireless network is available, and (4) determining, based on receiving the response that indicates the fake wireless network is available, that the network device is illegitimate. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0079376 A1 | 4/2007 | Robert et al. | |
| 2007/0153763 A1 | 7/2007 | Rampolla et al. | |
| 2007/0283042 A1 | 12/2007 | West et al. | |
| 2007/0288994 A1* | 12/2007 | Tang | H04L 29/12254 726/2 |
| 2010/0172259 A1 | 7/2010 | Aggarwal et al. | |
| 2010/0207732 A1 | 8/2010 | Patwari et al. | |
| 2012/0304297 A1 | 11/2012 | Chung et al. | |
| 2012/0309420 A1 | 12/2012 | Morgan et al. | |
| 2013/0217358 A1 | 8/2013 | Snider | |
| 2013/0217411 A1 | 8/2013 | Croy et al. | |
| 2014/0089202 A1* | 3/2014 | Bond | G06Q 40/02 705/71 |
| 2014/0201808 A1 | 7/2014 | Yada | |
| 2014/0304770 A1 | 10/2014 | Jung | |
| 2014/0378059 A1 | 12/2014 | Ouchi | |
| 2015/0024787 A1 | 1/2015 | Ben-Itzhak et al. | |
| 2016/0029217 A1 | 1/2016 | Yoo | |
| 2016/0149935 A1 | 5/2016 | Liu et al. | |
| 2016/0192136 A1 | 6/2016 | Pan et al. | |
| 2016/0316426 A1 | 10/2016 | Kumar | |

OTHER PUBLICATIONS

"802.11 WLAN Packet Types", http://www.wildpackets.com/resources/compendium/wireless_lan/wlan_packet_types, as accessed Oct. 14, 2015, (Apr. 15, 2010).
Ankit Kurani; Systems and Methods for Detecting Potentially Illegitimate Wireless Access Points; U.S. Appl. No. 14/732,811, filed Jun. 8, 2015.
"Domain Name System", http://en.wikipedia.org/wiki/Domain_Name_System, as accessed Apr. 6, 2015, Wikipedia, (Jan. 23, 2004).
Mitchell, Bradley "What Is a DNS Server?", http://compnetworking.about.com/od/dns_domainnamesystem/f/dns_servers.htm, as accessed Apr. 6, 2015, (Feb. 19, 2007).
"What is the difference between public and private IP addresses?", http://supportcenter.verio.com/KB/questions.php?questionid=655, as accessed Apr. 6, 2015, Verio Inc., (On or before Apr. 6, 2015).
Justin Harmon; Systems and Methods for Detecting Potentially Illegitimate Wireless Access Points; U.S. Appl. No. 14/608,218, filed Jan. 29, 2015.
Michael Shavell, et al; Systems and Methods for Detecting Illegitimate Devices on Wireless Networks; U.S. Appl. No. 14/616,763, filed Feb. 9, 2015.
Michael Shavell, et al; Systems and Methods for Detecting Illegitimate Devices on Wireless Networks; U.S. Appl. No. 14/616,761, filed Feb. 9, 2015.
Justin Harmon; Systems and Methods for Detecting Potentially Illegitimate Wireless Access Points; U.S. Appl. No. 14/625,075, filed Feb. 18, 2015.
Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).
Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.
"WiFi Pineapple", https://www.wifipineapple.com/, as accessed Dec. 3, 2014, (Sep. 26, 2011).
"Smart WiFi Toggler", https://play.google.com/store/apps/details?id=com.sebouh00.smartwifitoggler&hl=en, as accessed Dec. 3, 2014, (Dec. 13, 2012).
"Coordinate Distance Calculator", http://boulter.com/gps/distance/?from=38.2500%B0+N%2C+85.7667%B0+W&to=38.0297%B0+N%2C+84.4947%B0+W&units=m, as accessed Dec. 3, 2014, (On or before Dec. 3, 2014).
"802.11 WLAN Packet Types", http://www.wildpackets.com/resources/compendium/wireless_lan/wlan_packet_types, as accessed Dec. 3, 2014, WildPackets, Inc., (Apr. 15, 2010).
"Wireless access point", http://en.wikipedia.org/wiki/Wireless_access_point, as accessed Dec. 3, 2014, Wikipedia, (Apr. 14, 2004).
"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).
"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).
Cipriani, Jason "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).
Boubina DR, "How to Disable Wifi Auto Connect on iPhone", https://snapguide.com/guides/disable-wifi-auto-connect-on-iphone/, as accessed Dec. 3, 2014, (Jul. 22, 2012).
"LG G3—WiFi Auto-On Issue", https://support.t-mobile.com/thread/75809, as accessed Dec. 3, 2014, (Aug. 7, 2014).
"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).
"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).
K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).
"Rogue access point", http://en.wikipedia.org/wiki/Rogue_access_point, as accessed Dec. 3, 2014, Wikipedia, (Oct. 22, 2005).
"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).
"Tracking down a rogue access point", http://security.stackexchange.com/questions/10783/tracking-down-a-rogue-access-point, as accessed Dec. 9, 2014, (Jan. 18, 2012).
"Traceroute", https://en.wikipedia.org/wiki/Traceroute, as accessed Dec. 9, 2014, Wikipedia, (Feb. 24, 2004).
Hunt, Troy "The beginners guide to breaking website security with nothing more than a Pineapple", http://www.troyhunt.com/2013/04/the-beginners-guide-to-breaking-website.html, as accessed Dec. 9, 2014, (Apr. 17, 2013).
"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).
"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).
"Frame check sequence", http://en.wikipedia.org/wiki/Frame_check_sequence, as accessed Dec. 9, 2014, Wikipedia, (Apr. 5, 2005).
"Service set (802.11 network)", http://en.wikipedia.org/wiki/Service_set_%28802.11_network%29, as accessed Dec. 9, 2014, Wikipedia, (Jul. 10, 2009).
"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).
Dai Zovi, Dino A., "KARMA Attacks Radioed Machines Automatically", http://theta44.org/karma/, as accessed Dec. 9, 2014, (Jan. 17, 2006).
Girsas, Paul "Wifi Radar", https://play.google.com/store/apps/details?id=girsas.wifiradar&hl=en, as accessed Jan. 16, 2015, (Dec. 24, 2013).

(56) References Cited

OTHER PUBLICATIONS

"Chapter 6—Configuring Radio Setting", http://www.cisco.com/c/en/us/td/docs/wireless/access_point/12-4_10b_JA/configuration/guide/scg12410b/scg12410b-chap6-radio.htm l, as accessed Jan. 16, 2015, Cisco, (On or before Sep. 15, 2014).
"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (On or before Sep. 6, 2014).
"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).
"Aruba 100 Series Access Points", http://www.arubanetworks.com/assets/ds/DS_AP100Series.pdf, as accessed Jan. 16, 2015, Data Sheet, Aruba Networks, Inc., (On or before Jan. 16, 2015).
Notenboom, Leo A., "How can I block neighboring wireless networks?", http://ask-leo.com/how_can_i_block_neighboring_wireless_networks.html, as accessed Jan. 16, 2015, (Jan. 30, 2007).
Roos, Dave "How Wireless Mesh Networks Work", http://computer.howstuffworks.com/how-wireless-mesh-networks-work.htm, as accessed Jan. 16, 2015, (Dec. 4, 2008).
Leslie, David "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).
Pacchiano, Ronald "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).
"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (On or before Sep. 25, 2007).
"Locating Rogue WiFi Access Points", https://www.virtuesecurity.com/blog/locating-rogue-wifi-access-points/, as accessed Jan. 16, 2015, Virtue Security, (Oct. 5, 2013).
"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).
Michael Shavell, et al; Systems and Methods for Detecting Network Security Deficiencies on Endpoint Devices; U.S. Appl. No. 15/199,149, filed Jun. 30, 2016.
Captive portal; https://en.wikipedia.org/wiki/Captive_portal, as accessed May 17, 2016; Wikipedia; (Jan. 25, 2005).

\* cited by examiner

SYSTEMS AND METHODS FOR DETECTING ILLEGITIMATE DEVICES ON WIRELESS NETWORKS

BACKGROUND

Wireless networks and wireless access points may provide users of internet-enabled devices with efficient and/or widespread access to wired network connections. For example, wireless access points in public locations (e.g., restaurants and airports) may enable users to check their email, access online bank statements, or log into other online accounts at practically any time or place. Due to the enormous amount of data distributed via wireless networks, attackers may increasingly target wireless networks to obtain sensitive information such as financial data, credit card information, account passwords, etc. For example, an attacker may configure a malicious device (e.g., a so-called WIFI PINEAPPLE) to create an illegitimate wireless network that fakes or hijacks a wireless network known to a computing device. Once the computing device connects to the illegitimate wireless network, the attacker may view all traffic distributed via the network.

Unfortunately, conventional network security systems may fail to accurately and reliably detect such attacks. For example, traditional methods for detecting spoofed networks may rely on remembering properties such as Basic Service Set Identifiers (BSSIDs) of wireless access points within networks. However, these properties may vary across legitimate access points to the networks. As such, conventional security systems may falsely determine that a network is being spoofed or that a network device is illegitimate. Accordingly, the instant disclosure identifies and addresses a need for improved systems and methods for detecting illegitimate devices on wireless networks.

SUMMARY

As will be described in greater detail below, the instant disclosure describes various systems and methods for detecting illegitimate devices on wireless networks by generating a fake network identification string and transmitting a request to connect to the network identified by the fake identification string. The systems and methods described herein may then detect an illegitimate network device by receiving a response from the illegitimate network device that indicates the fake network is available.

In one example, a computer-implemented method for performing such a task may include (1) generating a fake network identification string that uniquely identifies a fake wireless network, (2) transmitting a request to connect to the fake wireless network, (3) receiving, in response to the request, a response from a network device that indicates the fake wireless network is available, and (4) determining, based on receiving the response that indicates the fake wireless network is available, that the network device is illegitimate. In some examples, determining that the network device is illegitimate may include determining that the network device is spoofing the fake wireless network.

In some examples, generating the fake network identification string may include generating a fake service set identifier. In these examples, transmitting the request to connect to the wireless network may include transmitting a probe request that contains a request to access a wireless network identified by the fake service set identifier. Additionally in these examples, receiving the response that indicates the fake wireless network is available may include receiving a probe response that indicates the wireless network identified by the fake service set identifier is available.

In some embodiments, transmitting the request to connect to the fake wireless network may include transmitting the request in response to determining that the computing device is outside of a predetermined geographic region. Additionally or alternatively, the method may include transmitting the request periodically at a predetermined interval.

In some examples, in response to determining that the network device is illegitimate, the method may further include alerting a user of the computing device that the network device is illegitimate. Additionally or alternatively, the method may include preventing the computing device from connecting to at least one wireless network within a predetermined range of the network device.

In one embodiment, a system for implementing the above-described method may include a (1) generation module that generates a fake network identification string that uniquely identifies a fake wireless network, (2) a transmission module that transmits a request to connect to the fake wireless network, (3) a reception module that receives, in response to the request, a response from a network device that indicates the fake wireless network is available, and (4) a determination module that determines, based on receiving the response that indicates the fake wireless network is available, that the network device is illegitimate. In addition, the system may include at least one processor that executes the generation module, the transmission module, the reception module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) generate a fake network identification string that uniquely identifies a fake wireless network, (2) transmit a request to connect to the fake wireless network, (3) receive, in response to the request, a response from a network device that indicates the fake wireless network is available, and (4) determine, based on receiving the response that indicates the fake wireless network is available, that the network device is illegitimate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
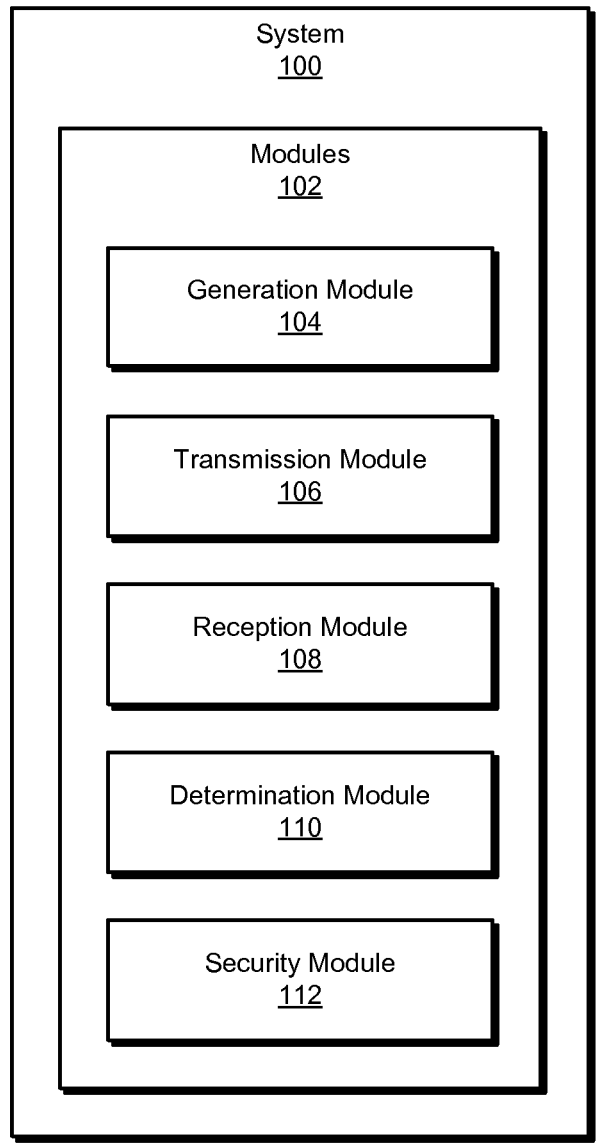
FIG. 1 is a block diagram of an exemplary system for detecting illegitimate devices on wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting illegitimate devices on wireless networks. As will be explained in greater detail below, by transmitting a fake request to connect to a fake wireless network, the systems and methods described herein may detect an illegitimate network device that claims to provide access to the fake wireless network. Specifically, after generating a probe request to identify and connect to a network identified by a fake Service Set Identifier (SSID), the disclosed systems and methods may detect a probe response sent from an illegitimate network device (such as a WIFI PINEAPPLE) that enables a computing device to connect to the network. The systems and methods described herein may then warn users and/or computing devices that a nearby malicious device is attempting to spoof wireless networks. As such, the systems and methods described herein may detect and prevent Man-in-the-Middle (MITM) attacks that attempt to trick computing devices into connecting to illegitimate wireless network devices in order to obtain sensitive information distributed via the illegitimate networks.

Figure 2:
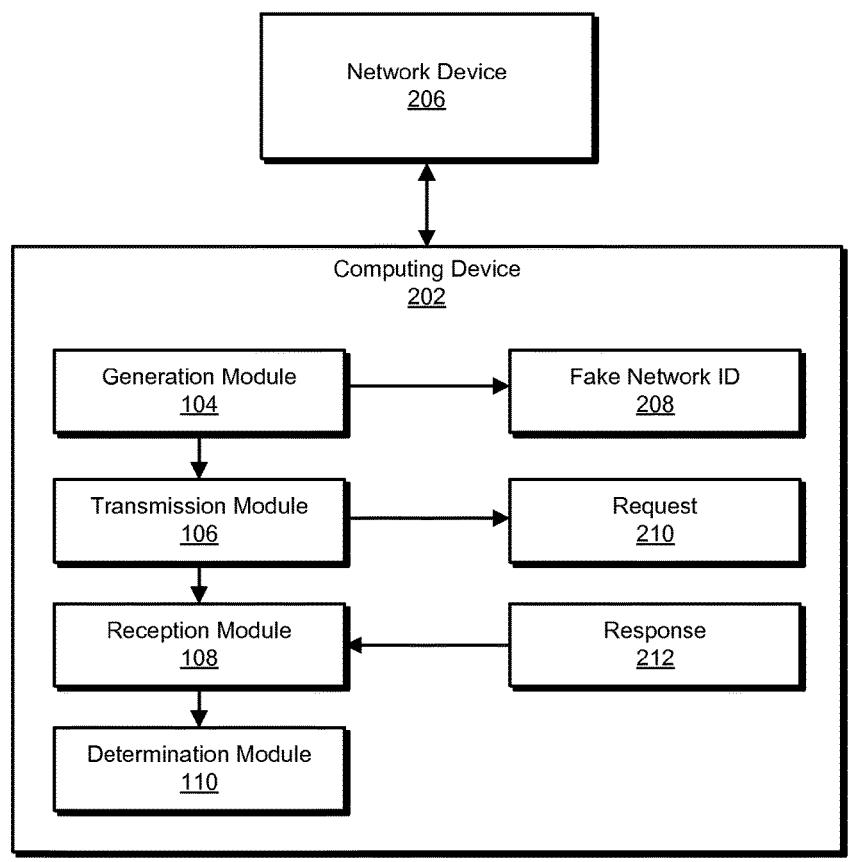
FIG. 2 is a block diagram of an additional exemplary system for detecting illegitimate devices on wireless networks.

The following will provide, with reference to FIGS. 1 and 2, detailed descriptions of exemplary systems for detecting illegitimate devices on wireless networks. Detailed descriptions of corresponding computer-implemented methods will also be provided in connection with FIG. 3. In addition, detailed descriptions of exemplary probe responses that contain requests to access fake wireless networks will be provided in connection with FIG. 4. Detailed descriptions of exemplary probe responses sent in response to probe requests will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting illegitimate devices on wireless networks. As illustrated in this figure, exemplary system 100 may include one or more modules 102 for performing one or more tasks. For example, and as will be explained in greater detail below, exemplary system 100 may include a generation module 104 that generates a fake network identification string that uniquely identifies a fake wireless network. Exemplary system 100 may also include a transmission module 106 that transmits a request to connect to the fake wireless network.

In addition, and as will be described in greater detail below, exemplary system 100 may include a reception module 108 that receives, in response to the request, a response from a network device that indicates the fake wireless network is available. Exemplary system 100 may also include a determination module 110 that determines, based on receiving the response that indicates the fake wireless network is available, that the network device is illegitimate. Finally, exemplary system 100 may include a security module 112 that performs at least one security action in response to the determination that the network device is illegitimate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a network device 206. In one example, computing device 202 may be programmed with one or more of modules 102 in order to determine the legitimacy of network device 206.

In one embodiment, one or more of modules 102 from FIG. 1 may, when executed by at least one processor of computing device 202, enable computing device 202 to detect illegitimate devices on wireless networks. For example, and as will be described in greater detail below, generation module 104 may cause computing device 202 to generate a fake network identification string (e.g., fake network ID 208) that uniquely identifies a fake wireless network. Transmission module 106 may then cause computing device 202 to transmit a request (e.g., request 210) to connect to the fake wireless network. Next, reception module 108 may cause computing device 202 to receive, in response to request 210, a response (e.g., response 212) from a network device (e.g., network device 206) that indicates the fake wireless network is available. Finally, determination module 110 may determine, based on receiving response 212, that network device 206 is illegitimate.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network device 206 generally represents any type or form of computing device that is capable of facilitating connections between computing devices and wireless networks. In some examples, network device 206 may receive a request from computing device 202 to connect to a wireless network. Network device 206 may then facilitate the process of connecting computing device 202 to the network. In some embodiments, network device 206 may represent a router, switch, and/or wireless access point capable of connecting computing device 202 to an intranet, a Wide Area Network (WAN), a Local Area Network (LAN), a Wireless Local Area Network (WLAN) a Personal Area Network (PAN), the Internet, or the like. Additionally or alternatively, and as will be explained in greater detail below, network device 206 may represent a malicious or illegitimate network device capable of emulating or creating a wireless network requested by computing device 202.

Figure 3:
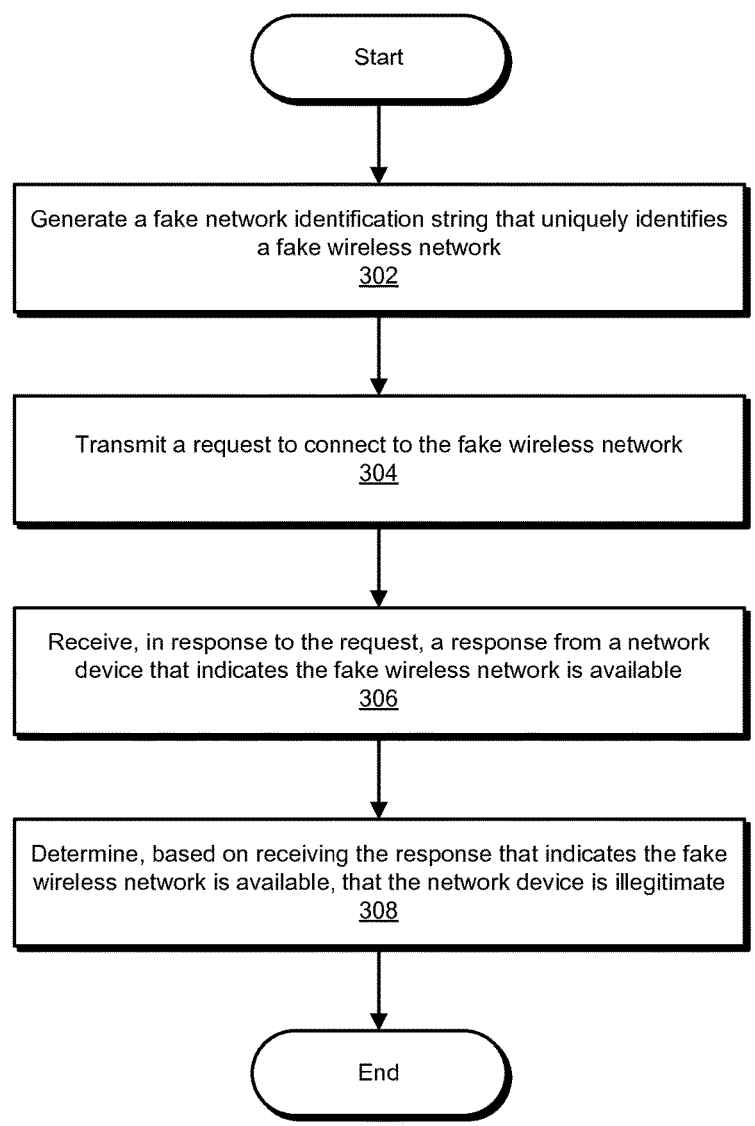
FIG. 3 is a flow diagram of an exemplary method for detecting illegitimate devices on wireless networks.

FIG. 3 is a flow diagram of an exemplary computer-implemented method 300 for detecting illegitimate devices on wireless networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may generate a fake network identification string that uniquely identifies a fake wireless network. For example, generation module 104 may, as part of computing device 202 in FIG. 2, generate fake network ID 208.

The term "network identification string" as used herein, generally refers to any type or form of name, label, or moniker that designates or identifies a network. In some examples, a network identification string may be composed of alphanumeric characters or other human-readable text (e.g., "HomeNetwork123"). In other examples, a network identification string may be a binary, hexadecimal, or other computer-readable string. In an exemplary embodiment, a network may be identified by a SSID. A SSID may be any series of 0-32 octets assigned as a label to a WLAN. In addition, the term "fake network identification string," as used herein, generally refers to any correctly formatted and/or valid network identification string that has not been assigned to an existing network.

The systems described herein may generate a fake network identification string in a variety of ways. In some examples, generation module 104 may generate fake network ID 208 by generating a random string of binary, hexadecimal, and/or alphanumeric characters. For example, generation module 104 may implement a random text or number generator to generate fake network ID 208. In another example, generation module 104 may receive user input or consult a predetermined list of fake network IDs to identify a network identification string unlikely to exist, such as "FakeNetwork3000." In general, generation module 104 may generate fake network ID 208 in any way such that fake network ID 208 represents a valid network ID (e.g., a valid SSID) but that does not describe any existing network whose range includes the current geographic location of computing device 202.

At step 304, one or more of the systems described herein may transmit a request to connect to the fake wireless network. For example, transmission module 106 may, as part of computing device 202 in FIG. 2, transmit request 210.

The systems described herein may transmit a request to connect to the fake wireless network in a variety of ways. In some examples, transmission module 106 may include fake network ID 208 within request 210. Transmission module 106 may then broadcast fake network ID 208 within request 210 to any and/or all network devices that may be within range of computing device 202. In an exemplary embodiment, transmission module 106 may transmit fake network ID 208 within a probe request.

The term "probe request," as used herein, generally refers to any communication sent from a computing device to a wireless access point that includes a request to identify and/or connect to at least one wireless network. Specifically, a probe request may represent a probe request frame as described by 802.11 standards. In some examples, a computing device may broadcast a probe request to identify any nearby wireless networks that are compatible with the computing device. In other examples, a computing device may transmit a probe request that contains a request to connect to a particular wireless network. For example, when not connected to a network, a computing device may automatically and periodically distribute probe requests that include the SSID of any known network (e.g., networks that the computing device has previously connected to) in order to determine if the known network is currently available.

Figure 4:
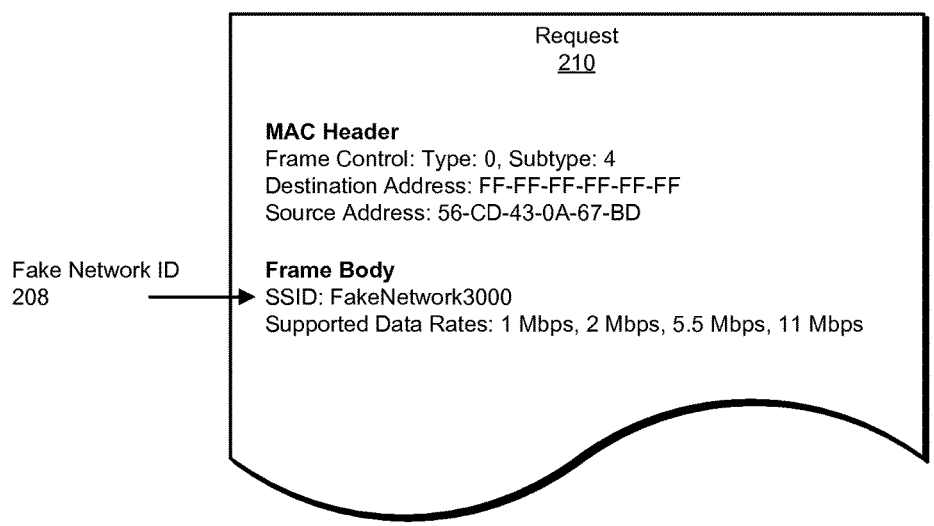
FIG. 4 is an illustration of an exemplary probe request containing a fake network identification string.

As an example, FIG. 4 illustrates a probe request that includes fake network ID 208. As shown in FIG. 4, request 210 may include a MAC (Media Access Control) header and a frame body. The MAC header may include a variety of standard information fields. For example, the MAC header may include a frame control field that contains the type of frame (in this example, "0", indicating a management frame) and the subtype of frame (in this example, "4", indicating a probe request frame). The MAC header may also include a destination address (in this example, "FF-FF-FF-FF-FF-FF," a wildcard address indicating that response 212 is directed towards all available receiving stations). As shown in FIG. 4, the MAC header may additionally include a source address (in this example, "56-CD-43-0A-67-BD," representing the MAC address of computing device 202).

Also as shown in FIG. 4, the frame body of request 210 may include a variety of information directed to a recipient of request 210. For example, the frame body may include fake network ID 208. Specifically, the frame body may include an SSID (in this example, "FakeNetwork3000") to which computing device 202 is attempting to connect. The frame body may also include a field that identifies the data rates (in this example, 1 Mbps, 2 Mbps, 5.5 Mbps, and 11 Mbps) supported by computing device 202. Although not shown in FIG. 4, the MAC header and frame body sections may include any additional field specified by 802.11 standards, such as an additional address field, a "duration" field, a "sequence control" field, a "request information" field, an "extended supported rates" field, a "supported operating classes" field, etc. Furthermore, request 210 may include a "frame check sequence" section that contains a 32-bit error-detecting code.

In some examples, transmission module 106 may repeatedly transmit request 210 (or a similar request) in order to dynamically detect new network security threats. For example, transmission module 106 may periodically transmit request 210 at a predetermined interval (e.g., every 30 seconds, every 10 minutes, etc.). Additionally or alternatively, transmission module 106 may transmit request 210 in response to determining that computing device 202 is outside of a predetermined geographic region. For example, transmission module 106 may determine that computing device 202 has left an area in which the likelihood of an illegitimate network device is low (e.g., the home of a user of computing device 202). In other examples, transmission module 106 may determine that computing device 202 has entered a region in which the likelihood of an illegitimate network device is higher (e.g., a public building such as an airport). Transmission module 106 may then transmit request 210 in response to determining that computing device 202 is at an increased risk of encountering an illegitimate network device.

At step 306, the systems described herein may receive, in response to the request, a response from a network device that indicates the fake wireless network is available. For example, reception module 108 may, as part of computing device 202 in FIG. 2, receive response 212 from network device 206 in response to request 210.

The systems described herein may receive a response that indicates the fake network is available in a variety of ways. In some examples, reception module 108 may receive a probe response from network device 206 in response to transmitting a probe request containing fake network ID 208. The term "probe response," as used herein, generally refers to any communication sent from a wireless access point to a computing device that indicates the wireless access point provides access to a requested wireless network. Specifically, a probe response may represent a probe response frame as described by 802.11 standards.

Figure 5:
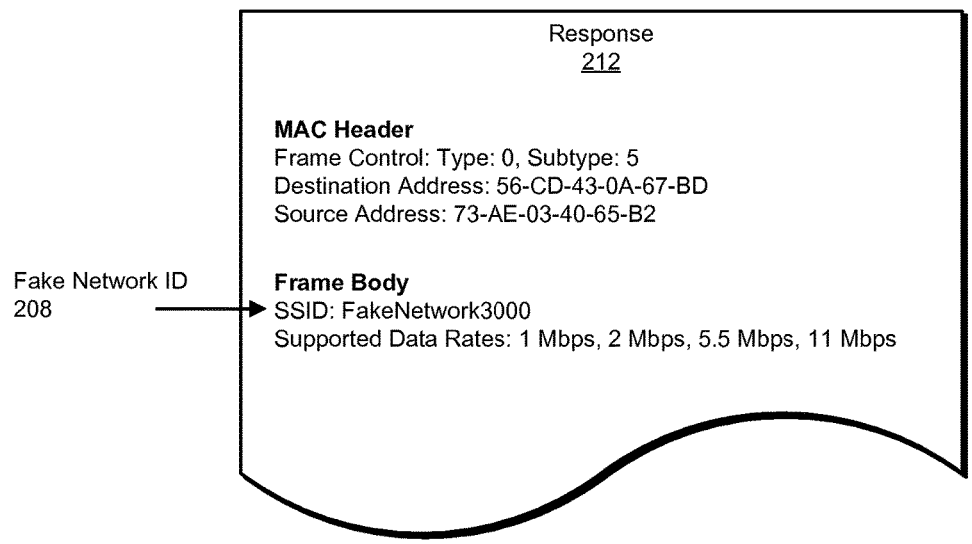
FIG. 5 is an illustration of an exemplary probe response sent in response to a probe request.

In some embodiments, reception module 108 may determine that the probe response indicates the network identified by fake network ID 208 is available. As an example, FIG. 5 illustrates a probe response that identifies the network associated with fake network ID 208. Similar to request 210 within FIG. 4, response 212 within FIG. 5 may include a MAC header and a frame body. The MAC header may include many of the same fields as the MAC header of request 210, such as a frame control field specifying the type of frame (in this example, "0", indicating a management frame) and the subtype of frame (in this example, "5", indicating a probe response frame). The MAC header may also include a destination address (in this example, "56-CD-43-0A-67-BD," the MAC address of computing device 202 shown in FIG. 4). In addition, the MAC header may include a source address (in this example, "73-AE-03-40-65-B2," representing the MAC address of network device 206).

As shown in FIG. 5, the frame body of response 212 may include fake network ID 208. Specifically, the frame body may indicate that the network identified by the "FakeNetwork3000" SSID (requested within request 210) is available. Furthermore, the frame body may indicate that FakeNetwork3000 is capable of operating at each of the data rates specified within request 210 (i.e., 1 Mbps, 2 Mbps, 5.5 Mbps, and 11 Mbps). As with request 210 in FIG. 4, response 212 may include any additional field specified by 802.11 standards.

Although FIG. 4 and FIG. 5 illustrates frames operating within 802.11 standards, request 210 and response 212 may represent any type or form of frame, data packet, or other communication. For example, request 210 and response 212 may be formatted with ZIGBEE standards (i.e., 802.15.4 standards), BLUETOOH standards (i.e., 802.15.1 standards), or any additional 802 standard.

In some examples, reception module 108 may determine that computing device 202 receives response 212 within a predetermined amount of time after the transmission of request 210. For example, reception module 108 may listen for response 212 for an amount of time (e.g., 1 second, 10 seconds) sufficient for an illegitimate network device to return a probe response after receiving a probe request. In the event that reception module 108 does not receive a probe request within the predetermined amount of time, reception module 108 may determine that the current likelihood of an attack executed by a WIFI PINEAPPLE or similar device is low.

At step 308, the systems described herein may determine, based on receiving the response that indicates the fake wireless network is available, that the network device is illegitimate. For example, determination module 110 may, as part of computing device 202 in FIG. 2, determine that network device 206 is illegitimate based on receiving response 212.

The term "illegitimate network device," as used herein, generally refers to any type or form of network device that may falsely allege the credentials of a network to which it does not provide access. In some examples, an illegitimate network device may claim to provide access to a network requested by a computing device in order to trick the computing device into connecting to an illegitimate network. Once the computing device connects to the illegitimate network, an attacker may view all network traffic distributed via the illegitimate network.

The systems described herein may determine that the network device is illegitimate in a variety of ways. In some examples, determination module 110 may determine that network device 206 is illegitimate based on network device 206 claiming to provide access to the fake wireless network. In an exemplary embodiment, determination module 110 may determine that an attacker is spoofing the fake wireless network using an illegitimate network device (e.g., a WIFI PINEAPPLE). For example, an attacker may configure a WIFI PINEAPPLE to return a probe response for each received probe request that contains a request to access a wireless network. In the event that a WIFI PINEAPPLE intercepts a probe request for an existing wireless network, the WIFI PINEAPPLE may return a probe response that facilitates connecting an unsuspecting computing device to an illegitimate network. However, determination module 108 may detect the presence of a WIFI PINEAPPLE by determining that network device 206 claims to provide access to the fake wireless network.

In response to determining that network device 206 is illegitimate, the systems described herein may provide one or more security services to computing device 202 and/or a user of computing device 202. For example, security module 112 may prevent computing device 202 from connecting to at least one wireless network within a predetermined range of network device 206. Specifically, security module 112 may determine that network device 206 may be capable of spoofing nearby existing wireless networks. As such, security module 112 may prevent computing device 202 from accessing any wireless networks until entering a location in which determination module 110 does not detect an illegitimate network device.

Additionally or alternatively, security module 112 may alert (via, e.g., a graphical user interface) a user of computing device 202 that network device 206 is illegitimate. For example, security module 112 may notify the user that an illegitimate network device has been identified and to therefore restrict sensitive information distributed via network connections.

The systems described herein may be implemented in a variety of ways and provide a number of advantages. As explained above, by transmitting a fake request to connect to a fake wireless network, the systems and methods described herein may detect an illegitimate network device that claims to provide access to the fake wireless network. Specifically, after generating a probe request to identify and connect to a network identified by a fake Service Set Identifier (SSID), the disclosed systems and methods may detect a probe response sent from an illegitimate network device (such as a WIFI PINEAPPLE) that enables a computing device to connect to the network. The systems and methods described herein may then warn users and/or computing devices that a nearby malicious device is attempting to spoof wireless networks. As such, the systems and methods described herein may detect and prevent Man-in-the-Middle (MITM) attacks that attempt to trick computing devices into connecting to illegitimate wireless networks in order to obtain sensitive information distributed via the illegitimate networks.

As the use of malicious network devices such as WIFI PINEAPPLES grows, so does the need to detect and prevent attacks implemented via these devices. Accordingly, U.S. patent application Ser. No. 14/616,763, titled Systems and Methods for Detecting Illegitimate Devices on Wireless Networks, the disclosure of which is incorporated in its entirety by this reference, describes additional systems and methods for detecting illegitimate network devices on wireless networks. In this application, a computer-implemented method may include (1) identifying an initial set of hops that represent devices on a wireless network that relay network traffic between the computing device and a destination, (2) identifying, after identifying the initial set of hops, a new set of hops that relay the network traffic between the computing device and the destination, (3) comparing the initial set of hops to the new set of hops, and (4) determining, based on the comparison, that the new set of hops includes an abnormality that indicates an illegitimate device is intercepting the network traffic on the wireless network between the computing device and the destination.

In one example, the abnormality may include an additional hop found in the new set of hops and not found in the initial set of hops. In another example, the abnormality may include a change between a round trip time for a packet sent to an initial device in the initial set of hops and a new round trip time of a new packet sent to a new device in the new set of hops, where the new device is a same number of hops from the computing device as the initial device. Additionally or alternatively, the abnormality may include a new network address of a device found in the new set of hops and not in the initial set of hops.

In one embodiment, identifying the initial set of hops may include identifying a gateway device that is a connection point between the wireless network and an external network and that relays the network traffic from the wireless network to the external network. In this embodiment, identifying the new set of hops may include examining a set of hops in between the computing device and the gateway device.

In some embodiments, identifying the new set of hops may include periodically reexamining, at a predetermined interval, the devices on the wireless network that relay the network traffic between the computing device and the destination. Additionally or alternatively, the initial set of hops may include only a predetermined number of hops counting outward from the computing device, the new set of hops may include the same predetermined number of hops. In this embodiment, determining that the new set of hops may include the abnormality may include detecting the abnormality within the predetermined number of hops.

In one embodiment, identifying the initial set of hops may include identifying a cached set of hops from a previous connection of the computing device to the wireless network and identifying the new set of hops may include identifying devices that are relaying the network traffic for a current connection of the computing device to the wireless network.

In this embodiment, comparing the initial set of hops to the new set of hops may include comparing the cached set of hops from the previous connection to the new set of hops from the current connection.

In some examples, the wireless network may include a public wireless network. Additionally or alternatively, identifying the initial set of hops may include executing a traceroute command, identifying the new set of hops may include repeating the traceroute command at a predetermined interval, and the abnormality may include a change in output of the traceroute command. In this embodiment, the illegitimate device may include a malicious device that intercepts the network traffic while relaying network traffic as if it were a legitimate network device. In some examples, the computer-implemented method may further include informing a user of the computing device about the illegitimate device on the wireless network.

In addition, U.S. patent application Ser. No. 14/616,761, titled Systems and Methods for Detecting Illegitimate Devices on Wireless Networks, the disclosure of which is incorporated in its entirety by this reference, describes further systems and methods for detecting illegitimate network devices on wireless networks. In this application, a computer-implemented method may include (1) identifying a baseline signal strength for a wireless network, (2) monitoring a signal strength of the wireless network to obtain at least one additional signal strength measurement, (3) determining that the additional signal strength measurement varies from the baseline signal strength beyond a threshold, (4) determining, in response to determining that the additional signal strength measurement varies from the baseline signal strength, that an illegitimate device is present on the wireless network, and (5) initiating, in response to determining that the illegitimate device is present on the wireless network, a security action.

In some examples, identifying the baseline signal strength may include: identifying a set of signal strength measurements for the wireless network and calculating a central tendency for the set of signal strength measurements. In one embodiment, the central tendency may include a mean value, a median value, and/or a mode value. In one embodiment, the threshold may include a percentage of the baseline signal strength. In one embodiment, the signal strength may include a Received Signal Strength Indication (RSSI). In some examples, monitoring the signal strength may include obtaining additional signal strength measurements periodically at a predetermined interval.

In one embodiment, the wireless network may be a public wireless network to which the computing device is connected and the illegitimate device may be a malicious device that represents itself as a wireless access point and intercepts network traffic intended for a legitimate wireless access point. In one embodiment, the security action may include (1) alerting a user of the computing device that the illegitimate device is present on the wireless network, (2) disconnecting the computing device from the wireless network, (3) preventing the computing device from connecting to the wireless network, and/or (4) disabling wireless networking on the computing device.

In some examples, all or a portion of the above-described applications may be combined in order to more accurately and/or efficiently detect illegitimate network devices. For example, a security system may implement one or more of the security measures of (1) transmitting a request to connect to a fake wireless network, (2) comparing an initial set of devices that relay network traffic on a wireless network with a new set of devices on the wireless network, (3) and determining whether a signal strength measurement of a wireless network varies from a baseline measurement. The security system may also incorporate any additional and/or related security measures. After detecting the presence of an illegitimate network device, the security system may perform one or more of the security actions described above, such as alerting a user about the illegitimate network device and/or preventing a computing device from accessing a nearby wireless network.

In one embodiment, the security system may perform each security measure simultaneously (e.g., at a predetermined interval). Alternatively, the security system may perform each security measure at separate times and/or in response to different events. For example, the security system may transmit a request to connect to a fake wireless network whenever a computing device leaves a predetermined geographic region. In this example, the security system may also periodically determine the signal strength of a wireless network while the computing device is connected to the wireless network. In this way, the security system may reduce resource consumption while maintaining a high level of protection.

Implementing multiple security measures may enable the security system to more accurately identify illegitimate network devices. For example, as attackers learn to mask their attempts to obtain sensitive information via illegitimate network devices, multiple security tests may be required to correctly detect the presence of an illegitimate device. Moreover, implementing multiple security measures may also reduce the risk of falsely identifying an illegitimate network device. For example, the security system may require that at least two out of three security measures return indications of an illegitimate network device before determining that a nearby network device is illegitimate. As such, the security system may reduce unnecessary and inconvenient security actions that may be implemented when an illegitimate network device is falsely identified.

Figure 6:
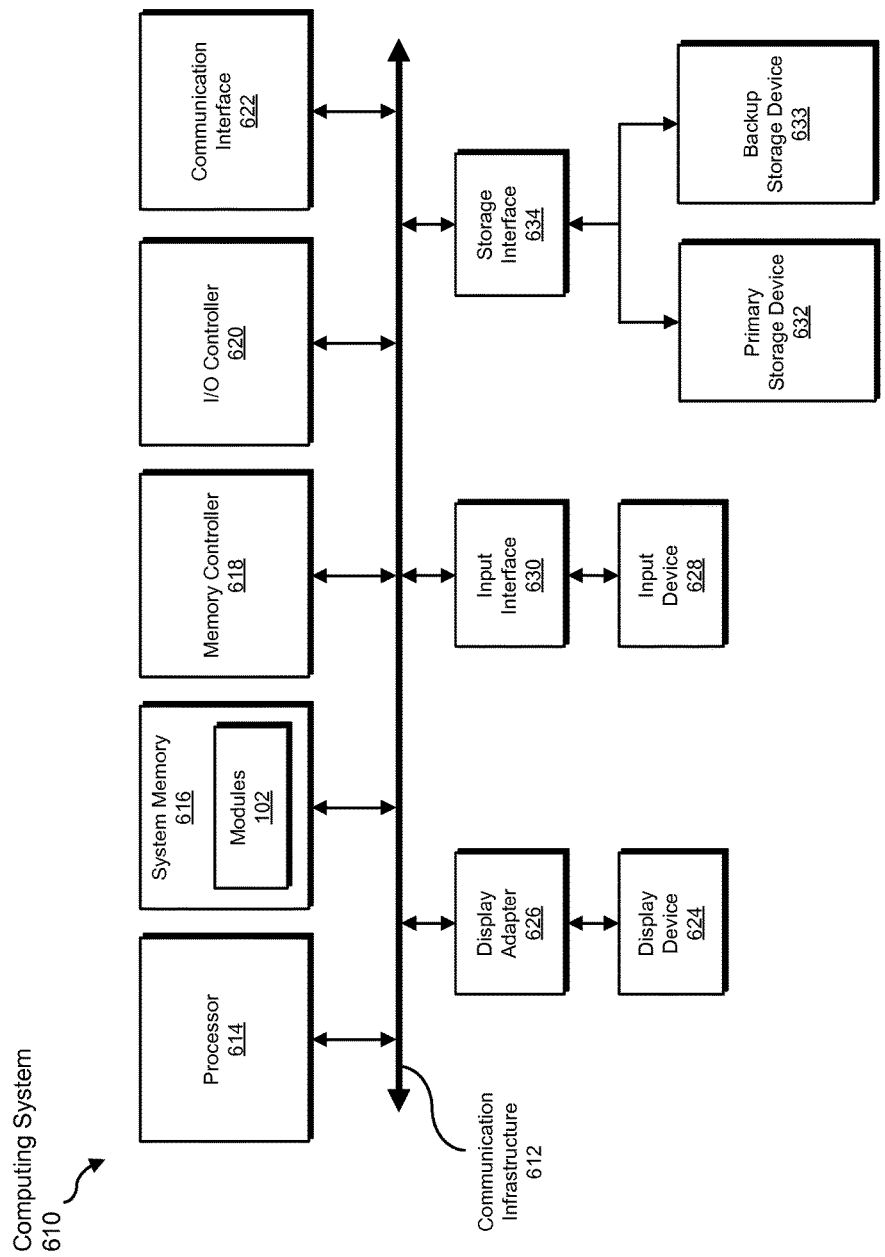
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
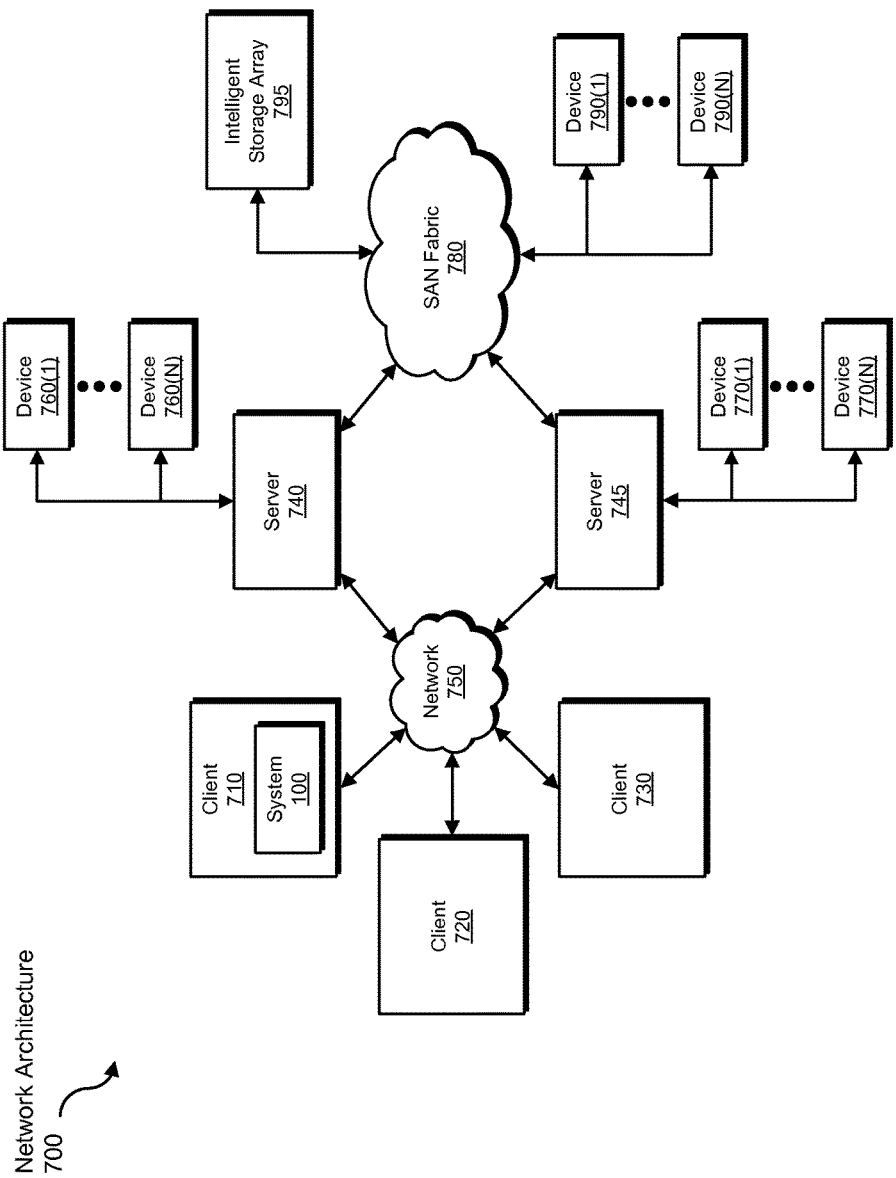
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting illegitimate devices on wireless networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a network identification string to be transformed, transform the network identification string, output a result of the transformation to a network device, use the result of the transformation to detect an illegitimate network device, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting illegitimate devices on wireless networks, at least a portion of the method being performed by a computing device comprising at least one processor, the method comprising:
   generating, by a computing device configured to detect illegitimate network devices, a fake network identification string that uniquely identifies a fake wireless network;
   transmitting, from the computing device, a request to connect to the fake wireless network;
   receiving, by the computing device in response to the request, a response from a network device that indicates the fake wireless network is available; and
   determining, by the computing device, based on receiving the response that indicates the fake wireless network is available, that the network device is illegitimate.

2. The method of claim 1, wherein generating the fake network identification string comprises generating a fake service set identifier.

3. The method of claim 2, wherein:
   transmitting the request to connect to the fake wireless network comprises transmitting a probe request that contains a request to access a wireless network identified by the fake service set identifier; and
   receiving the response that indicates the fake wireless network is available comprises receiving a probe response that indicates the wireless network identified by the fake service set identifier is available.

4. The method of claim 1, wherein transmitting the request to connect to the fake wireless network comprises transmitting the request in response to determining that the computing device configured to detect illegitimate network devices is outside of a predetermined geographic region.

5. The method of claim 1, wherein transmitting the request to connect to the fake wireless network comprises transmitting the request periodically at a predetermined interval.

6. The method of claim 1, wherein receiving the response that indicates the fake wireless network is available comprises receiving the response within a predetermined amount of time after transmitting the request to connect to the fake wireless network.

7. The method of claim 1, wherein determining that the network device is illegitimate comprises determining that the network device is spoofing the fake wireless network.

8. The method of claim 1, further comprising in response to determining that the network device is illegitimate, performing at least one of:
- alerting a user of the computing device configured to detect illegitimate network devices that the network device is illegitimate; and
- preventing the computing device from connecting to at least one wireless network within a predetermined range of the network device.

9. A system for detecting illegitimate devices on wireless networks, the system comprising:
- a generation module, stored in memory, that generates, on a computing device configured to detect illegitimate network devices, a fake network identification string that uniquely identifies a fake wireless network;
- a transmission module, stored in memory, that transmits, from the computing device, a request to connect to the fake wireless network;
- a reception module, stored in memory, that receives, at the computing device in response to the request, a response from a network device that indicates the fake wireless network is available;
- a determination module, stored in memory, that determines, on the computing device, based on receiving the response that indicates the fake wireless network is available, that the network device is illegitimate; and
- at least one physical processor configured to execute the generation module, the transmission module, the reception module, and the determination module.

10. The system of claim 9, wherein the generation module generates the fake network identification string by generating a fake service set identifier.

11. The system of claim 10, wherein:
- the transmission module transmits the request to connect to the fake wireless network by transmitting a probe request that contains a request to access a wireless network identified by the fake service set identifier; and
- the reception module receives the response that indicates the fake wireless network is available by receiving a probe response that indicates the wireless network identified by the fake service set identifier is available.

12. The system of claim 9, wherein the transmission module transmits the request to connect to the fake wireless network by transmitting the request in response to determining that the computing device configured to detect illegitimate network devices is outside of a predetermined geographic region.

13. The system of claim 9, wherein the transmission module transmits the request to connect to the fake wireless network by transmitting the request periodically at a predetermined interval.

14. The system of claim 9, wherein the reception module receives the response that indicates the fake wireless network is available by receiving the response within a predetermined amount of time after the request to connect to the fake wireless network is transmitted.

15. The system of claim 9, wherein the determination module determines that the network device is illegitimate by determining that the network device is spoofing the fake wireless network.

16. The system of claim 9, further comprising a security module that, in response to the determination that the network device is illegitimate, performs at least one of:
- alerting a user of the computing device configured to detect illegitimate network devices that the network device is illegitimate; and
- preventing the computing device from connecting to at least one wireless network within a predetermined range of the network device.

17. A non-transitory computer-readable medium comprising one or more computer-executable instructions that, when executed by at least one processor of a computing device configured to detect illegitimate network devices, cause the computing device to:
- generate, by the computing device, a fake network identification string that uniquely identifies a fake wireless network;
- transmit, from the computing device, a request to connect to the fake wireless network;
- receive, by the computing device in response to the request, a response from a network device that indicates the fake wireless network is available; and
- determine, by the computing device, based on receiving the response that indicates the fake wireless network is available, that the network device is illegitimate.

18. The computer-readable medium of claim 17, wherein the one or more computer-executable instructions cause the computing device to generate the fake network identification string by generating a fake service set identifier.

19. The computer-readable medium of claim 18, wherein the one or more computer-executable instructions cause the computing device to:
- transmit the request to connect to the fake wireless network by transmitting a probe request that contains a request to access a wireless network identified by the fake service set identifier; and
- receive the response that indicates the fake wireless network is available by receiving a probe response that indicates the wireless network identified by the fake service set identifier is available.

20. The computer-readable medium of claim 17, wherein the one or more computer-executable instructions cause the computing device to transmit the request to connect to the fake wireless network by transmitting the request in response to determining that the computing device is outside of a predetermined geographic region.

* * * * *